United States Patent
Mäenpää

(10) Patent No.: US 8,499,075 B2
(45) Date of Patent: Jul. 30, 2013

(54) ADAPTIVE SERVICE DISCOVERY IN STRUCTURED PEER-TO-PEER OVERLAY NETWORKS AND METHOD

(75) Inventor: Jouni Mäenpää, Nummela (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 35 days.

(21) Appl. No.: 13/022,001

(22) Filed: Feb. 7, 2011

(65) Prior Publication Data
US 2012/0198051 A1    Aug. 2, 2012

Related U.S. Application Data

(63) Continuation of application No. PCT/IB2011/000149, filed on Jan. 31, 2011.

(51) Int. Cl.
*G06F 15/173* (2006.01)

(52) U.S. Cl.
USPC ............ 709/224; 709/217; 709/226; 707/770

(58) Field of Classification Search
USPC ................. 709/201, 224, 204, 245, 203, 217, 709/226; 707/10, 770; 370/401
See application file for complete search history.

(56) References Cited

U.S. PATENT DOCUMENTS

| | | | |
|---|---|---|---|
| 2002/0049760 A1* | 4/2002 | Scott et al. | 707/10 |
| 2005/0267992 A1* | 12/2005 | Huitema et al. | 709/245 |
| 2009/0016368 A1* | 1/2009 | Lowekamp | 370/401 |
| 2009/0100128 A1* | 4/2009 | Czechowski et al. | 709/203 |
| 2010/0064008 A1* | 3/2010 | Yan et al. | 709/204 |
| 2010/0332579 A1* | 12/2010 | Sengupta et al. | 709/201 |
| 2011/0087775 A1* | 4/2011 | Lee et al. | 709/224 |

OTHER PUBLICATIONS

J. Mäenpää and G. Camarillo: Service Discovery Usage for REsource LOcation and Discovery (RELOAD), draft-ietf-p2psip-service-discovery-01, Internet-Draft (work in progress), Jul. 2010, pp. 1-15. [Available online]: <http://tools.ietf.org/html/draft-ietf-p2psip-service-discovery-01>.

C. Jennings, B. B. Lowekamp, E. K. Rescorla, S. A. Baset, and H. G. Schulzrinne: "Resource Location and Discovery Base Protocol", draft-ietf-p2psip-base-11, Internet Draft (work in progress), Oct. 12, 2010, pp. 1-156. [Available online]: <http://tools.ietf.org/html/draft-ietf-p2psip-base-11>.

(Continued)

*Primary Examiner* — Jungwon Chang
(74) *Attorney, Agent, or Firm* — Potomac Patent Group, PLLC

(57) ABSTRACT

An overlay network, node and method for adaptive service discovery. The method uses an adaptive service discovery in the overlay network for finding a peer that provides a desired service; generates a tree structure for current peers that provide the desired service; assign the current peers that provide the desired service to different levels of the tree structure; estimate, when a peer intends to register for the desired service with the adaptive service discovery, a number S of actual peers that provide the desired service; and calculates, based on the estimated number of actual peers providing the desired service, an optimal starting level for the peer to register for the desired service.

24 Claims, 9 Drawing Sheets

OTHER PUBLICATIONS

S. Rhea, B. Godfrey, B. Karp, J. Kubiatowicz, S. Ratnasamy, S. Shenker, I. Stoica, and H. Yu: OpenDHT: A Public DHT Service and Its Uses. In Proceeedings of the ACM SIGCOMM Conference on Computer Communications, 2005, pp. 1-12. [Available online]: <www.opendht.org/f230-rhea.pdf>.

Brad Karp et al., "Spurring Adoption of DHTs with OpenHash, a Public DHT Service"; Proceedings of the Third International Workshop on Peer-to-Peer Systems; Feb. 1, 2004; pp. 1-6.

International Search Report mailed on Oct. 20, 2011 in related application No. PCT/IB2011/000149.

Written Opinion of the International Searching Authority mailed on Oct. 20, 2011 in related application No. PCT/IB2011/000149.

Written Opinion of the International Preliminary Examining Authority mailed on Jan. 17, 2013 in related application No. PCT/IB2011/000149.

International Preliminary Report on Patentability mailed on May 2, 2013 in related Application No. PCT/IB2011/000149.

\* cited by examiner

ADAPTIVE SERVICE DISCOVERY IN STRUCTURED PEER-TO-PEER OVERLAY NETWORKS AND METHOD

RELATED APPLICATION

This application is related to, and claims priority from, International Application No. PCT/IB2011/000149, filed on Jan. 31, 2011, entitled "Adaptive Service Discovery in a Structured Peer-to-Peer Overlay Networks and Method" to Jouni Mäenpää, the entire disclosure of which is incorporated here by reference.

TECHNICAL FIELD

The present invention generally relates to systems, software and methods and, more particularly, to mechanisms and techniques for providing an adaptive service discovery in an overlay network.

BACKGROUND

During the past years, various business models envision the use of large-scale distributed systems. These systems are hard to deploy and have their own challenges. One such example is distributed hash tables (DHTs). To lower the barriers facing DHT-based applications, a public DHT service called OpenDHT has been created (see for example, Rhea et al., OpenDHT: A Public DHT Service and Its Uses, Proceedings of the ACM SIGCOMM Conference on Computer Communications, 2005, the entire content of which is incorporated herein by reference).

REsource LOcation And Discovery (RELOAD) is a Peer-to-Peer (P2P) signaling protocol that can be used to maintain the overlay network and to store data in and retrieve data from the overlay. In a P2P overlay network such as a RELOAD Overlay Instance, the peers forming the overlay share their resources in order to provide the service the system has been designed to provide. The peers in the overlay both provide services to other peers and request services from other peers. Examples of possible services offered by peers in a RELOAD Overlay Instance include a TURN relay service, a voice mail service, a gateway location service, and a transcoding service. Typically, only a small subset of the peers participating in the system are providers of a given service. A peer that wishes to use a particular service faces the problem of finding peers that are providing that service from the Overlay Instance.

Although RELOAD defines a Traversal Using Relays around Network Address Translation (TURN) specific service discovery mechanism, it does not define a generic service discovery mechanism as part of the base protocol. A Recursive Distributed Rendezvous (ReDiR) service discovery mechanism used in the OpenDHT discussed above can be applied to RELOAD overlays.

ReDiR is a service discovery mechanism for structured P2P overlay networks. As noted above, ReDiR has been adopted as a service discovery mechanism for the RELOAD protocol that is being specified in the Peer-to-Peer Session Initiation Protocol (P2PSIP) working group of the Internet Engineering Task Force (IETF). The RELOAD protocol and thus also ReDiR are used to enable the P2PSIP distributed interpersonal communication service.

ReDiR implements service discovery by building a tree structure of the peers that provide a particular service. ReDiR trees are service-specific, i.e., each service has its own ReDiR tree. The tree structure is embedded tree node by tree node into a DHT based P2P overlay network using the regular "Put" and "Get" requests provided by the DHT. The purpose of a Put request is to store a data record into the P2P overlay network, whereas the purpose of a Get request is to fetch a data record from the network.

Each tree node in the ReDiR tree contains pointers to peers providing a particular service. The ReDiR tree 10 is illustrated in FIG. 1. The tree 10 has multiple levels 12 to 18. Each tree node belongs to a particular level. For example, tree nodes 24a-d belong to level 16. The root 12 of the tree 10 contains a single node 20 at level 0. The immediate children of the root are at level 1, and so forth. The ReDiR tree has a branching factor b, which is 2 in the example shown in FIG. 1. At every level "i" in the tree, there are at most $b^i$ nodes. The nodes at any level are labeled from left to right, such that a pair (i, j) uniquely identifies the jth node (counted from the left) at level i. The tree is embedded into the DHT node by node, by storing the values of node (i, j) at key H(namespace, i, j), where H is a hash function such as Secure Hash Algorithm One (SHA-1), and namespace is a string that identifies the service being provided. As an example, the namespace of a TURN relay service could be for instance the string "turn-service".

Each level in the ReDiR tree spans the whole identifier space 28 of the DHT. At each level, the ID space is divided among the tree nodes. Each tree node is further divided into b intervals. In FIG. 1, each tree node has two intervals because b=2. As an example, because level 2 in the figure has 4 tree nodes, each of which has two intervals, the whole identifier space of the DHT is at that level divided into 8 parts (i.e., intervals). When storing a record with identifier X in a given level, the record is stored in the interval within whose range X falls.

The act of storing a record in the ReDiR tree is referred to as ReDiR service registration procedure. The act of fetching a record from the ReDiR tree is referred to as ReDiR service discovery operation. It is noted that the ReDiR and RELOAD protocols are know in the art and this section briefly familiarizes a reader with general features of these protocols. As these protocols are known in the art, it is noted that they are standardized and it is not obvious for one skilled in the art to modify these protocols.

ReDiR service discovery is performed when a client wishing to use a service (henceforth referred to as a service client) wants to discover a service provider. The ReDiR service registration procedure is carried out by a service provider to store its contact information (i.e., a ReDiR data record) in the P2P overlay network. The ReDiR service registration is valid for a certain amount of time. When this time has passed, the service provider needs to refresh its records in the ReDiR tree by repeating the service registration procedure.

Various simulations run for the ReDiR protocol have identified a number of areas where ReDiR performs poorly. One finding is that ReDiR is difficult to be correctly configured, ab initio, to achieve an optimal performance and to prevent the mechanism from becoming expensive (in terms of delay, failure rate, etc.) to use.

Accordingly, it would be desirable to provide devices, systems and methods that avoid the afore-described problems and drawbacks.

SUMMARY

Recursive Distributed Rendezvous (ReDiR) is a service discovery mechanism for structured Peer-to-Peer (P2P) overlay networks. ReDiR has been adopted as a service discovery mechanism for the REsource LOcation And Discovery (RELOAD) protocol that is being specified in the Peer-to-Peer Session Initiation Protocol (P2PSIP) working group. The RELOAD protocol and thus also ReDiR are used to enable the P2PSIP distributed interpersonal communication service. However, the existing service discovery mechanism is rigid and not designed to adapt to a changing network.

According to an exemplary embodiment, there is a method that provides an adaptive service discovery in a Distributed Hash Table, DHT, based Peer-to-Peer, P2P, overlay network. The overlay network includes plural peers and some of the plural peers providing various services. The method includes using the adaptive service discovery in the DHT P2P overlay network for finding a peer that provides a desired service; generating a tree structure for current peers that provide the desired service; assigning the current peers that provide the desired service to different levels of the tree structure; estimating, when a peer intends to register for the desired service with the adaptive service discovery, a number S of actual peers that provide the desired service; and calculating, based on the estimated number of actual peers providing the desired service, an optimal starting level for the peer to register for the desired service.

According to another exemplary embodiment, there is a peer in a Distributed Hash Table, DHT, based Peer-to-Peer, P2P, overlay network, the overlay network including plural peers and some of the plural peers providing various services. The peer includes an interface configured to communicate with the overlay network, and to use an adaptive service discovery in the DHT P2P overlay network for finding another peer that provides a desired service; and a processor configured to estimate, when the peer registers for the desired service with the adaptive service discovery, a number S of actual peers that provide the desired service. The processor is also configured to calculate, based on the estimated number of actual peers providing the desired service, an optimal starting level for the peer to register for the desired service.

According to still another exemplary embodiment, there is a Distributed Hash Table, DHT, based Peer-to-Peer, P2P, overlay network, the overlay network including plural peers and some of the plural peers providing various services. The network includes an adaptive service discovery protocol for finding a peer that provides a desired service, the adaptive service discovery protocol having a tree structure for current peers that provide the desired service; a processor configured to estimate, when a peer intends to register for the desired service with the adaptive service discovery, a number S of actual peers that provide the desired service, and configured to calculate, based on the estimated number of actual peers providing the desired service, an optimal starting level for the peer to register for the desired service; and an interface connected to the processor and configured to communicate with the peer that intends to register and provide the optimal starting level.

It is an object to overcome some of the deficiencies discussed in the previous section and to provide an adaptive service discovery mechanism so that parameters of the system may be adjusted as the system evolves, which improves a performance of the system. One or more of the independent claims advantageously provides an adaptive service discovery mechanism.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
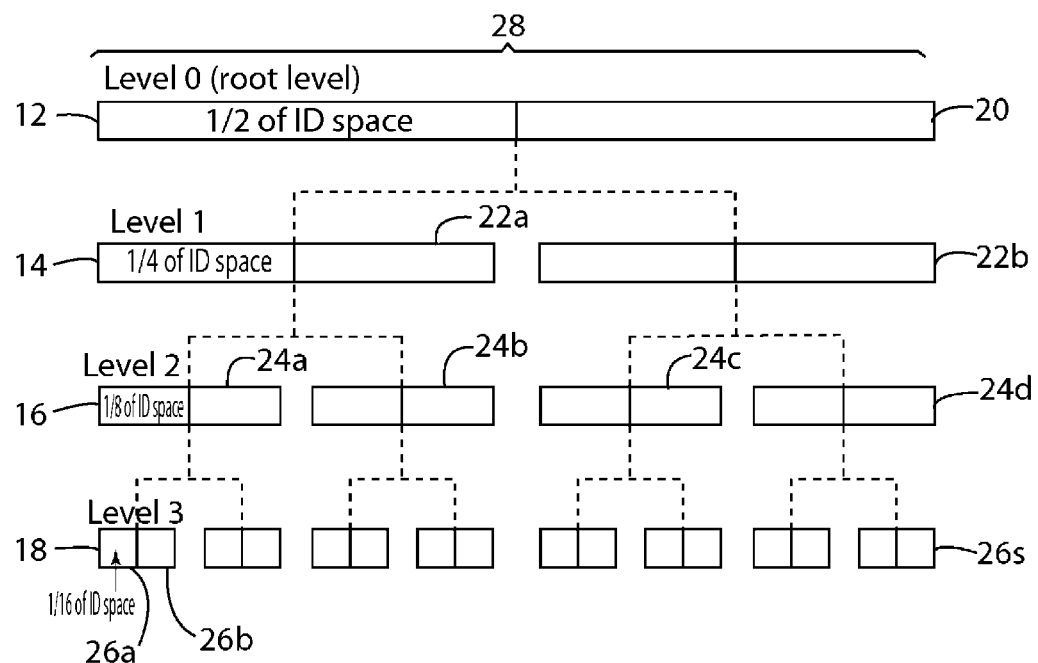
FIG. 1 is a schematic diagram of a tree for a given service.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of ReDiR in the context of Peer-to-Peer Session Initiation Protocol. However, the embodiments to be discussed next are not limited to this protocol but may be applied to other existing P2P based protocols.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to an exemplary embodiment, the novel features to be discussed next address a shortcoming in the ReDiR service discovery mechanism that has been adopted as a service discovery mechanism for P2PSIP by the P2PSIP working group of the IETF. One feature is to dynamically adapt various parameters of the ReDiR during the runtime of the system. These parameters are adapted to achieve a best match with a current number of service providers in the overlay network. New mechanisms are added to ReDiR to estimate the number of service providers, to determine which parameters are optimal for a given number of service providers, and to spread information about changed parameters in the overlay network.

In order to fully appreciate the novel features, the traditional, default, ReDiR mechanism is briefly discussed next. The unmodified ReDiR mechanism uses a static branching factor. After the static branching factor has been initially configured, the branching factor stays unchanged during the lifetime of the system. Further, the unmodified ReDiR mechanism selects a starting level for discovery operations by recording the levels at which the last 16 service lookups completed. Then, the mechanism takes the most common depth of those depths. The starting level for registrations is set by using the level at which the previous registration completed. Thus, the traditional ReDiR has the branching factor and the starting level parameters fixed.

In the traditional ReDiR, the values for these parameters need to be chosen by the operator of the P2P service before launching the service. In this regard, it is known that ReDiR does not define any way to adapt the parameters at runtime. Setting the values beforehand is difficult since it requires a perfect knowledge about the future, i.e., the operator of the network must have an estimate of the number of service providers that will be present in the overlay. Even if the operator can come up with good values beforehand, the next problem is that the amount of service providers tends to vary over time due to the dynamic nature of P2P systems. If the number of service providers deviates too much from the estimate that the operator had before launching the service, the performance of ReDiR service discovery can drop significantly.

Figure 2:
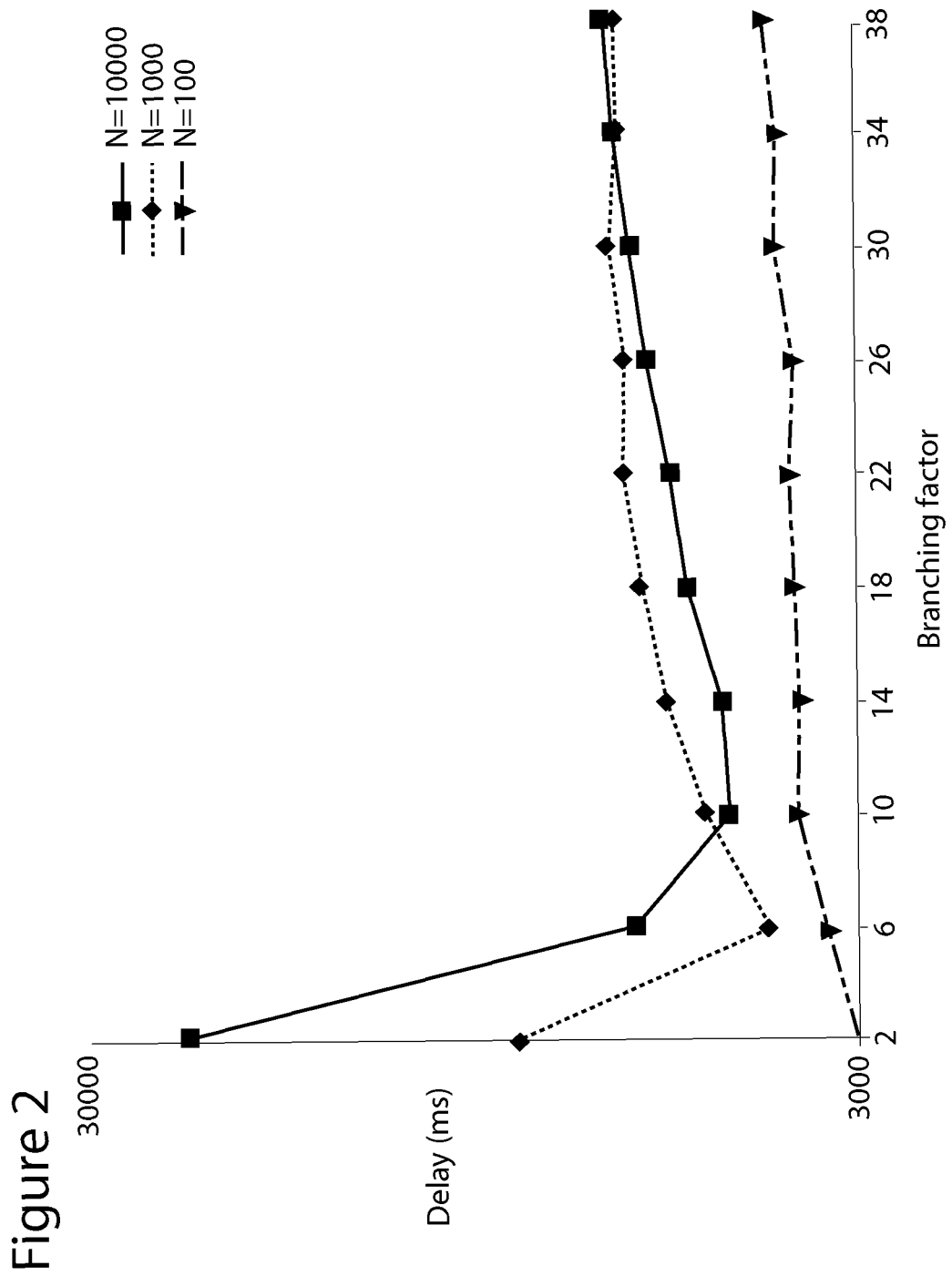
FIG. 2 is a graph illustrating a discovery delay in a network versus a branching factor of the tree.

Various simulations show this performance degradation. FIG. 2 illustrates which ReDiR branching factors are optimal in P2P overlay networks of different sizes. The graph in FIG. 2 shows the delay of ReDiR service discovery operation for different branching factor values. In the figure, N refers to the network size, i.e., the number of nodes where a node may be a computer, a processor, a mobile phone, a data transmitting/receiving device, etc. The figure shows the delays for three different network sizes: N=100, N=1000, and N=10000. It can be seen that the optimal branching factor depends on the network size. More specifically, the optimal values for the branching factor for N=100, N=1000, and N=10000, are 2, 6, and 10, respectively. Configuring the branching factor inappropriately for a given network size can have a negative impact on ReDiR discovery and registration operation delays. As an example, when N=10000, the difference between the best and worst performing branching factors is 5-fold for the service discovery delay.

Figure 3:
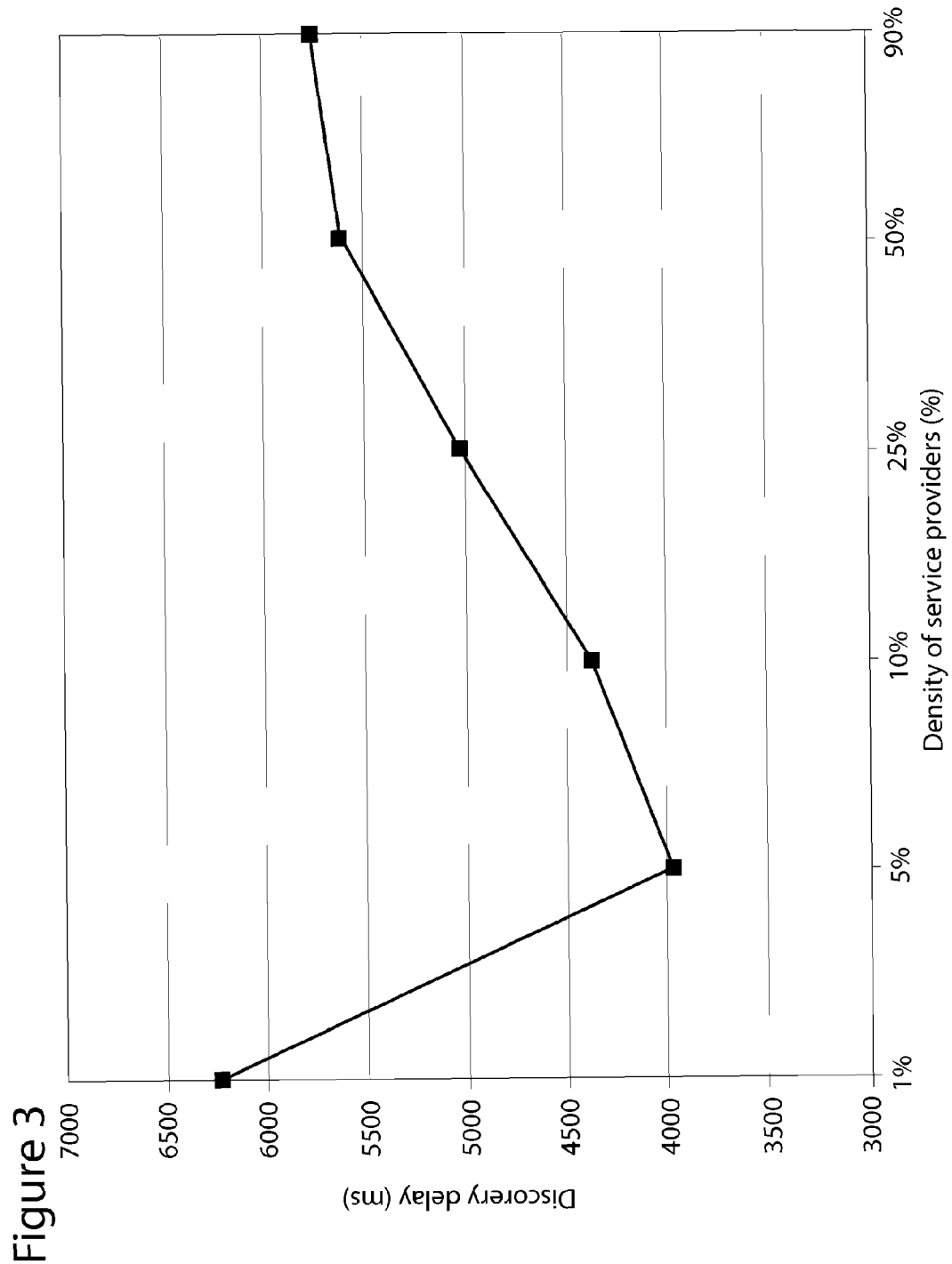
FIG. 3 is a graph illustrating a discovery delay in a network versus a density of service providers.

FIG. 3 illustrates the impact of not adapting the branching factor and starting level in the ReDiR tree as the number of service providers changes. The x-axis in FIG. 3 shows the density of service providers in a 10000-node overlay network. As an example, when the density is 1%, there are 100 service providers present in the network. FIG. 3 shows that if the network is initially configured under the assumption that 5% of the nodes will be service providers, but in reality the density is only 1%, this poor choice of ReDiR parameters results in the delays becoming 1.6-times higher than expected. If the real density is even less than 1%, the degradation in performance can be even more severe.

Thus, as the traditional ReDiR mechanisms are not able to dynamically adapt the above noted parameters during the runtime of the system, the system would suffer from suboptimal or even unacceptable performance during the rest of its lifetime.

In other words, the traditional ReDiR mechanisms work well if the overlay network is fairly static (i.e., the size of the network stays at the same level and the number of service providers stays constant over time) and if the nodes perform frequent service discovery operations. In contrast, real-world overlays are fairly dynamic and in many cases a node may perform a ReDiR discovery operation only once (e.g., to discover a TURN relay server for Network Address Translator (NAT) traversal from the overlay upon joining the overlay). Thus, in practice, the existing methods in ReDiR for selecting the starting level result is suboptimal or even unacceptable delays for the real-world systems.

According to an exemplary embodiment, the following features are implemented for making the ReDiR mechanism capable of dynamically adjusting some of its parameters. Each feature is discussed in more details later. The order of features is not necessary the order listed below.

One feature is to implement the ReDiR discovery operation and the ReDiR registration operation to start from the same starting level, SL, in the tree. If the currently used SL changes, it changes for both the discovery and the registration operations. Another feature is to implement a mechanism in which each service provider (e.g., user terminal) calculates an estimate for the total number of service providers in the overlay network, before carrying out the ReDiR service registration procedure. Details about calculating the estimate are described later. Still another feature is related to the optimal starting level. Based on the estimate of the total number of service providers, a service provider performing a registration procedure needs to calculate an optimal starting level to be used in registrations and discovery operations. In one application, each service provider calculates the optimal starting level. An approach for calculating the optimal starting level is also described later.

Another feature is the mechanism of switching the starting level. If the optimal starting level is different from the currently used starting level, the service provider switches to a new starting level. The service provider needs to take measures to ensure that other service providers and service clients have enough information to switch to the new starting level. Details of this approach are also described later. According to another feature, the service providers may use the mechanism described above also to determine an optimal branching factor of the ReDiR tree, as will be discussed later.

Figure 4:
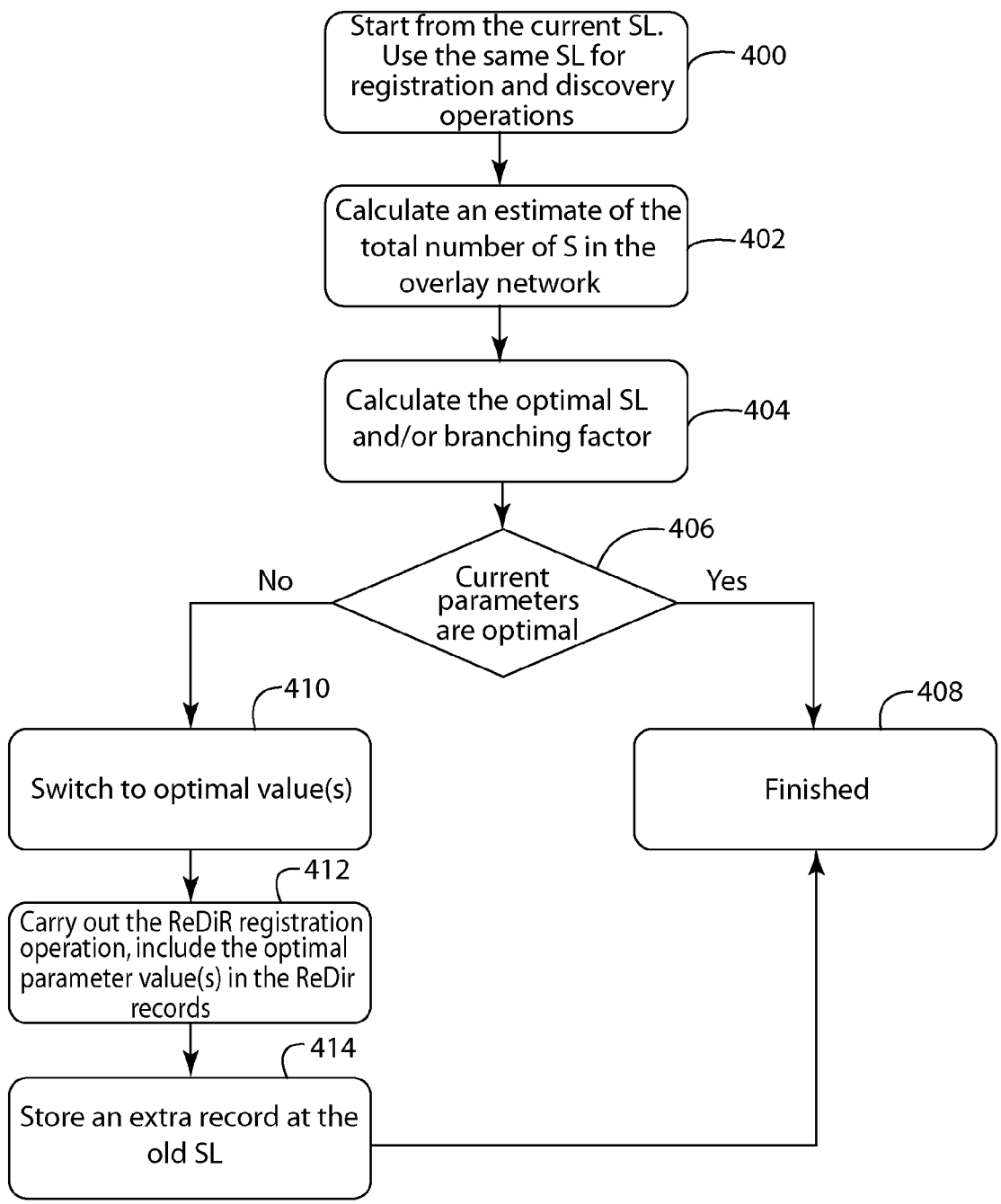
FIG. 4 is a flow chart for providing adaptive service discovery according to an exemplary embodiment.

According to an exemplary embodiment, the above noted features may be implemented as illustrated in FIG. 4. FIG. 4 shows, at a high level, the flow of the process for adapting the above noted parameters. In step 400 a current SL is used. The same SL is used for registration and discovery operations. In step 402, a total number S of service providers is determined. The number S accounts only for the nodes of overlay network that provide a certain service. In step 404, an optimal SL level and/or branching number is calculated. In step 406, the current parameters are evaluated relative the calculated parameters. If it is determined that the current parameters are optimal (e.g., a difference between the current parameters and the calculated parameters are below predetermined thresholds), the process is finished in step 408 and the current parameters are maintained.

However, if the results of the comparison in step 406 are negative (e.g., the current parameters are not optimal), the process advances to step 410 in which a switch to the optimal values is performed. In step 412 the ReDiR registration process is carried out for other nodes and in step 414 an extra record is stored for identifying the current SL. Selected steps are now discussed in more details.

Figure 5:
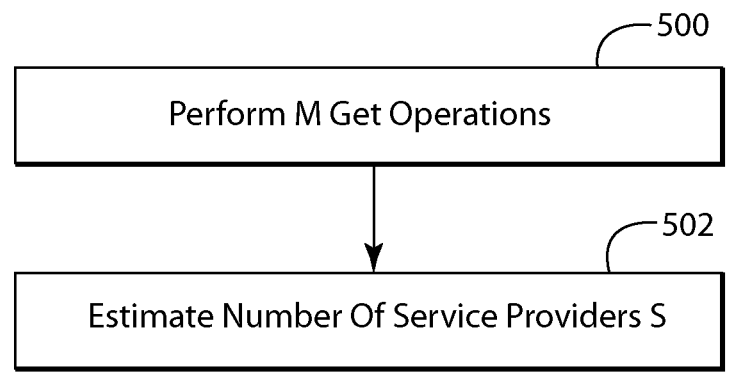
FIG. 5 is a flow chart for estimating a number of service providers in a network according to an exemplary embodiment.

Regarding step 402, an algorithm for estimating the total number S in the overlay network is now discussed. A node n of the overlay network may be configured to calculate an estimate of the total number S of service providers in the overlay network as illustrated in FIG. 5. Node n may be any device of the overlay network. In step 500, the node n performs M Get operations. One of these operations is performed for the identifier of node n and the remaining M−1 operations are performed for randomly selected identifiers of nodes at a currently used starting level $SL_{current}$. In step 502 the node n calculates an estimate of the number of service providers S based on, for example, equation:

$$S = \frac{\sum_{i=0}^{M} R_i}{M} \times b^{SL_{current}},$$

where $R_i$ is the number of records contained in node i, b is the branching factor, and M is a predetermined number. It is noted that other equations may be imagined by those skilled in the art.

The method illustrated in FIG. 5 may take place every time when a service provider (node) refreshes its ReDiR record in the overlay. Note that if M is set to value 1, the procedure does not cause any extra overhead compared to normal ReDiR processing.

Next it is discussed an exemplary embodiment for calculating the optimal starting level of step 406. As already discussed above, in a traditional system, a node starts to look for information at a certain starting level in the tree. However, according to this exemplary embodiment a mechanism for calculating the optimal starting level is introduced. Such a mechanism may use probabilities for determining the optimal starting level. However, other mathematical techniques may be used for determining the optimal starting level.

According to this exemplary embodiment, the optimal starting level is calculated based on the estimate of the number of service providers S in the overlay. A service provider can use the procedure described in this exemplary embodiment to check if the currently used starting level is optimal for the current conditions.

The inventor of this application has observed that the optimal performance (e.g., lowest delays and failure rates) for ReDiR is achieved when two events are occurring. First, it is desirable that the ReDiR tree nodes at the starting level have as many records as possible. Second, it is desirable that the intervals within the tree nodes at the starting level have as few records as possible. If these two events occur, discovery operations will finish at the starting level of the ReDiR tree with a high probability. This fact will ensure that the delays are short as the system does not have to change the starting level. These two events may be casted, for example, in terms of probabilities as follows:

$P(\text{finish at } SL_i) = P(\text{successor found}) \times P(n.\text{id not sandwiched})$, where n.id is the identifier of the node n performing service discovery, P(successor found) refers to the probability that a successor of n.id is found at the starting level, P(n.id not sandwiched) refers to the probability that n.id is either the highest or lowest identifier in its interval at the starting level, and $P(\text{finish at } SL_i)$ refers to the probability that the discovery operation will finish at a given starting level $SL_i$.

The P(successor found) can be calculated as follows:

$$P(\text{successor found}) = \min\left(\frac{S}{b^{SL_i}}, 1\right),$$

where S is the estimate of the total number of service providers in the overlay, b is the branching factor, and $SL_i$ is the starting level.

The other probability P(n.id not sandwiched) can be calculated as follows:

$$P(n \cdot id \text{ not sandwiched}) = \min\left(\frac{2}{\left(\frac{S}{b^{SL_i+1}} + 1\right)}, 1\right).$$

To determine which starting level is optimal for the current conditions in the overlay network, a service provider may be configured to calculate $P(\text{finish at } SL_i)$ for all possible starting levels $0 \leq i \leq SL_{max}$, where $SL_{max}$ is the maximum starting level. $SL_{max}$ can be set, for instance, to $2 \times SL_{current}$, where $SL_{current}$ is the currently used starting level.

Having calculated the probabilities $P(\text{finish at } SL_i)$ for various starting levels $SL_i$, the service provider chooses the starting level $SL_i$ that results in the highest probability. The service provider will then start the registration procedure from this new (optimal) level. In addition, the service provider needs to refresh its record in the previous starting level $SL_{previous}$ to ensure that the previous starting level has the correct number of records so that other service providers are able to detect the need to switch to a different SL.

Figure 6:
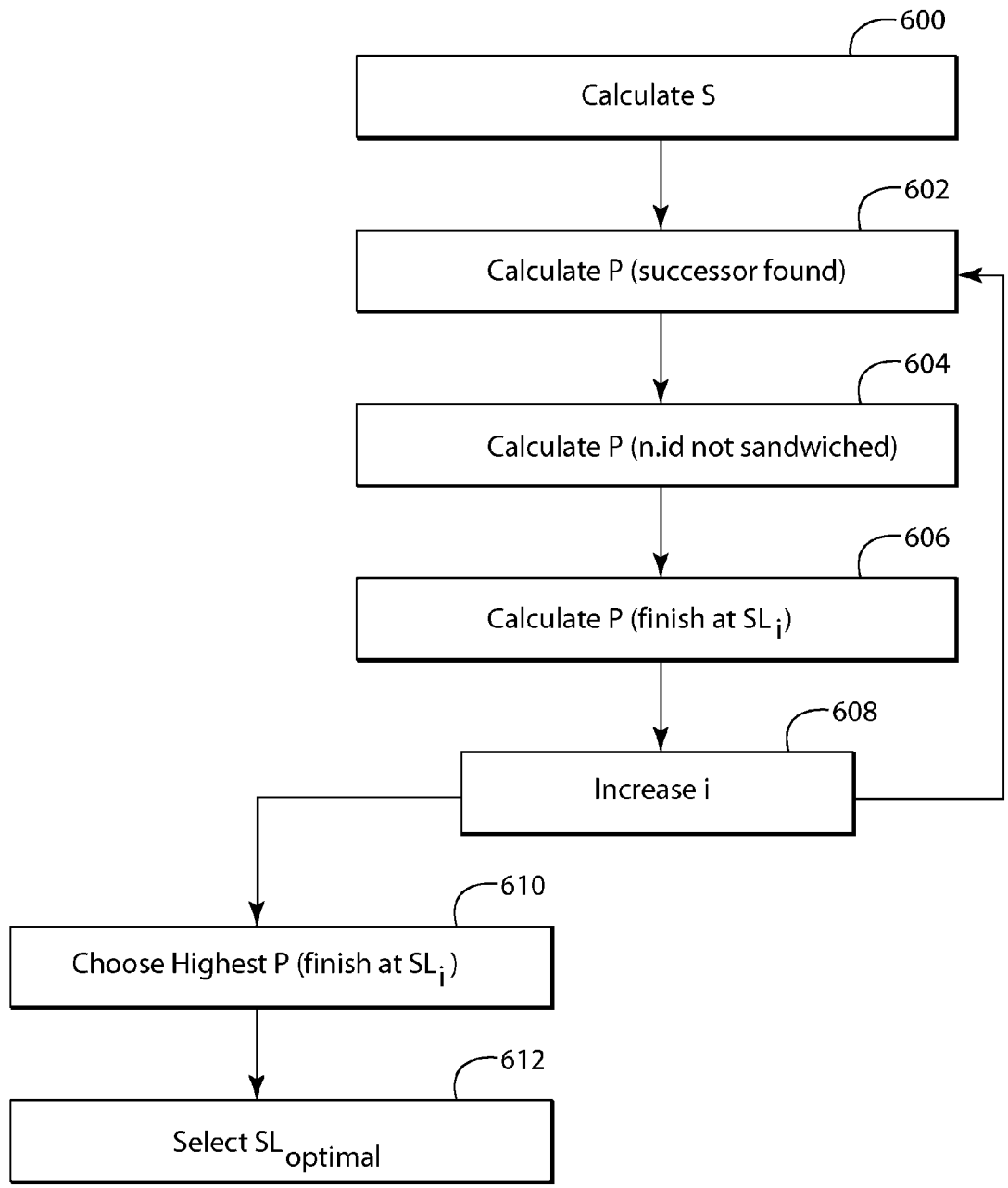
FIG. 6 is a flow chart for estimating an optimal starting level according to an exemplary embodiment.

Thus, a service provider may be configured to perform the steps shown in FIG. 6. In step 600, the service provider (or node) determines the number S of service providers. Based on this estimated number, in step 602 the service provider determines P(successor found), in step 604 determines P(n.id not sandwiched) and in step 606 calculates $P(\text{finish at } SL_i)$. It is noted that when calculating the probabilities in steps 602, 604, and 606, each one depends on the $SL_i$. Then, in step 608 the index "i" is increased by one and steps 602, 604, and 606 are repeated until all the desired values for index i have been used. Then, in step 610 the service provider chooses the highest value of the $P(\text{finish at } SL_i)$ and in step 612 identifies which starting level corresponds to that value. The determined starting level is considered to be the $SL_{optimal}$.

In one application, each service provider calculates the above probabilities when an estimate S for the total number of service provider is available. However, it is noted that the calculation of the optimal starting level does not have to be performed each time the estimate S is calculated.

According to another exemplary embodiment, a mechanism for transitioning from the current starting level to the optimal starting level for all the nodes in the network overlay is now discussed. In this regard it is noted that both the service providers and the service clients need to perform this change.

For ensuring that not only the service provider that determines the optimal starting level performs the change to this level but also the remaining nodes of the network do the same thing, this service provider needs to still store one extra record to the previous (old) starting level. However, this extra record does not need to be refreshed as is the case for the traditional records. This extra record needs to be present only for the duration of a single ReDiR refresh interval. The system is designed in this way to ensure that the number of records in the old starting level stay at the old tree long enough so that the other service providers can detect the need to modify their starting level as well.

Figure 7:
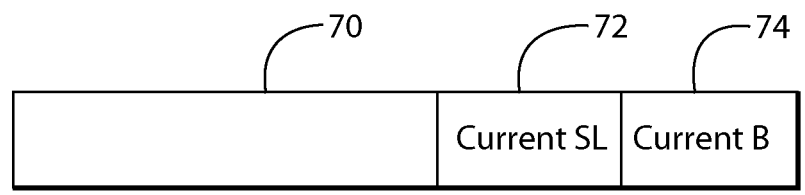
FIG. 7 is a schematic representation of a record structure according to an exemplary embodiment.

To implement this change to the traditional ReDiR, in an exemplary embodiment illustrated in FIG. 7, every ReDiR record 70 is extended with a new field 72, for example, currentSL, that indicates the currently used starting level in the ReDiR tree. The purpose of this field is to allow service clients to detect the change in starting level. If a service client, after performing the initial Get operation at its current starting level, detects that the starting level included in the fetched record is different from the level of the current operation, it needs to switch the starting level to currentSL. In this way any node of the network becomes aware that the starting level has changed and a change to the new starting level is necessary.

According to another exemplary embodiment, it is possible to select an optimal branching factor in the ReDiR tree in an adaptive fashion. This selection may be achieved by using different branching factor values $b_j$ ($2 \leq b_j \leq b_{max}$, where $b_{max}$ is the maximum branching factor, which due to practical reasons can be limited to a reasonably small value such as 38) in the probabilities for calculating the optimal starting level (discussed above with regard to FIG. 6) instead of a static branching factor b. Thus, according to this exemplary embodiment, the probabilities P(successor found) and P(n.id not sandwiched) may be calculated as noted above for each $b_j$ and the P(finish at $SL_i$) having the highest value determines which value $b_j$ for the branching factor to be used.

Thus, in one application, the above process may be used to select the combination of (i) an optimal branching factor and (ii) an optimal starting level by varying both the values $SL_i$ and $b_j$ in the above noted equations. When a new branching factor is selected, a ReDiR tree migration procedure may be used. Such a procedure is described next.

A precondition for using the ReDiR tree migration procedure is that a service provider detects the need to change the branching factor of the ReDiR tree based on its analysis as described above (see exemplary embodiment describing selecting optimal branching factor). By changing to a new branching factor, a same service has two parallel ReDiR trees. Having made the decision to switch to a new branching factor, the service provider performs the ReDiR registration procedure in the new tree (if the tree does not exist yet, then the first registration procedure will create the tree). However, the same service provider still has to store one record in the old ReDiR tree at the current starting level so that other service providers can also detect the need to migrate to a new tree. The other service providers can detect the need to change to a new tree as long as the number of records at the old starting level reflects the total number of service providers in the overlay. The old record needs not to be refreshed beyond the migration period, whose length equals the normal record refresh interval in the ReDiR tree.

In addition, to allow the service clients to detect the need to use a new ReDiR tree, an additional field 74, currentB, may be added to the ReDiR records 70. This new field indicates the currently used branching factor. Thus, if a service client determines that the value contained in currentB is different from the tree's branching factor, the service client knows that the system has migrated to a new ReDiR tree, whose branching factor is currentB. It is noted that record 70 may have either one of fields 72 or 74 or both of them.

According to still another exemplary embodiment, the mechanisms discussed above may be improved by adding a starting level to the overlay configuration. P2P protocols such as the RELOAD protocol used by P2PSIP maintain an overlay configuration document that is used by newly joining nodes to obtain overlay-specific information. The overlay document is also used to deliver updated values of overlay parameters to nodes that are already part of the overlay network.

To ensure that nodes that are joining the P2P overlay network receive information about the most recent branching factor and starting level values, the enrollment server of the overlay network (that is responsible for the overlay configuration document) can monitor the status of the ReDiR tree and update the values (branching factor, starting level, etc.) in the document as soon as it detects a change in the currently used parameters. Thus, the new and/or existing nodes may update these values from the overlay configuration document.

Based on one or more mechanisms discussed in the above exemplary embodiments, the performance of the ReDiR service discovery mechanism may be improved and the ReDiR mechanism becomes more suitable for use in P2PSIP.

As noted previously, the current way to configure various ReDiR parameters is to use fixed values selected before launching the P2P service. These choices result in sub-optimal or even unacceptable performance of the system if the initially configured values turn out to be incorrect (which often happens since coming up with correct values beforehand requires knowing the future, which is rarely possible). The exemplary embodiments, alone or in combination, solve this problem by dynamically adapting the parameters at runtime.

The mechanisms of the exemplary embodiments may be applied to any given DHT-based overlay network utilizing ReDiR. They are not specific either to a single DHT or P2PSIP-specific (P2PSIP has been used simply as an example in this disclosure).

Figure 8:
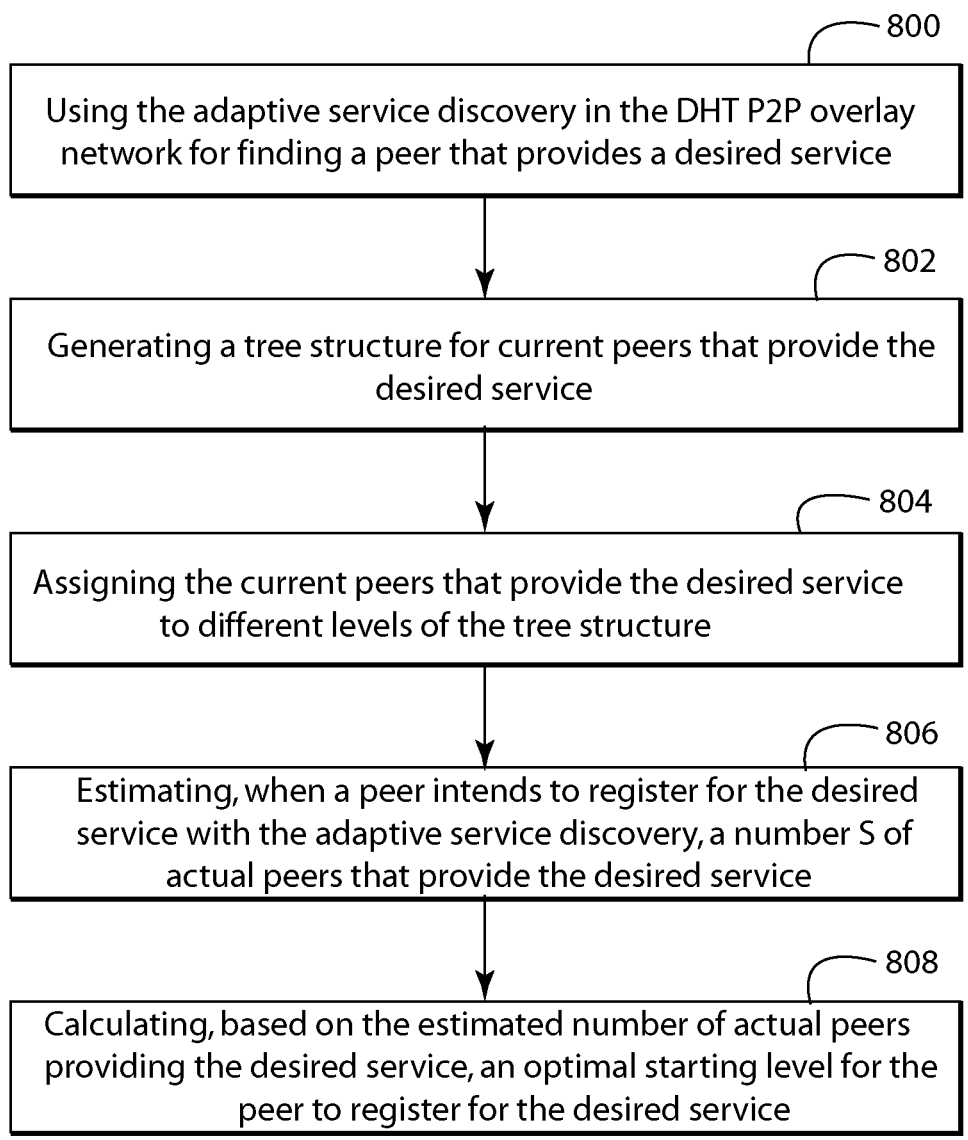
FIG. 8 is a flow chart of a method for providing adaptive service discovery according to another exemplary embodiment.

According to an exemplary embodiment illustrated in FIG. 8, there is a method for adaptive service discovery in a Distributed Hash Table, DHT, based Peer-to-Peer, P2P, overlay network. The overlay network includes plural peers and some of the plural peers providing various services. The method includes a step 800 of using the adaptive service discovery in the DHT P2P overlay network for finding a peer that provides a desired service; a step 802 of generating a tree structure for current peers that provide the desired service; a step 804 of assigning the current peers that provide the desired service to different levels of the tree structure; a step 806 of estimating, when a peer intends to register for the desired service with the adaptive service discovery, a number S of actual peers that provide the desired service; and a step 808 of calculating, based on the estimated number of actual peers providing the desired service, an optimal starting level for the peer to register for the desired service.

Figure 9:
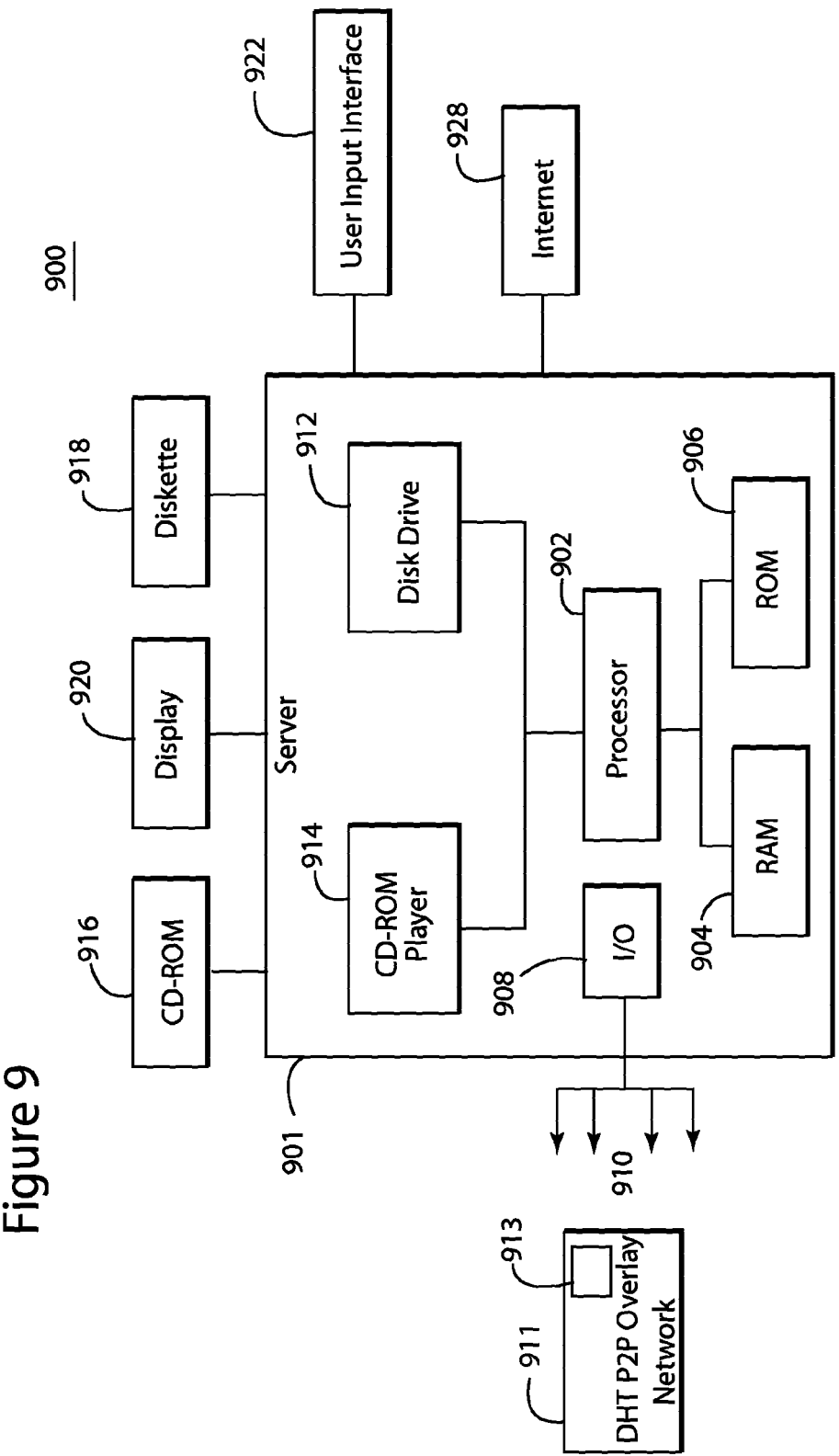
FIG. 9 is a schematic diagram of a peer that implements adaptive service discovery according to another exemplary embodiment.

An example of a representative peer (node) of a network capable of carrying out operations in accordance with the exemplary embodiments is illustrated in FIG. 9. At the same time, the structure shown in FIG. 9 may describe the structure of nodes of the overlay network. Hardware, firmware, software or a combination thereof may be used to perform the various steps and operations described herein. The node 900 of FIG. 9 is an exemplary computing structure that may be used in connection with such a system.

The exemplary node 900 suitable for performing the activities described in the exemplary embodiments may include a server 901. Such a server 901 may include a central processor (CPU) 902 coupled to a random access memory (RAM) 904 and to a read-only memory (ROM) 906. If the node 900 represents a node of the network, i.e., not a peer, one of these memories may store the adaptive system discovery. In one application, the node 900 may not include the server 901 but only its components, e.g., processor and memory. The ROM 906 may also be other types of storage media to store programs, such as programmable ROM (PROM), erasable PROM (EPROM), etc. The processor 902 may communicate with other internal and external components through input/output (I/O) circuitry 908 and interface 910, to provide control signals and the like.

Interface 910 may be connected to the DHT P2P overlay network 911 and network 911 may include the adaptive system discovery protocol 913. The adaptive system discovery protocol 913 may include computer instructions for calculating the quantities discussed in the previous embodiments. Alternatively, the adaptive system discovery protocol may be implemented in hardware, e.g., dedicated circuitry or both of them, hardware and software. In one application the adaptive system discovery 913 is stored in a node of the network 911. In another application, the adaptive system discovery may be stored in the node 900. The processor 902 carries out a variety of functions as is known in the art, as dictated by software and/or firmware instructions. The method discussed above may be implemented as computer instructions in any of the storage device of the node and the processor may be configured to perform the steps of these methods.

The server 901 may also include one or more data storage devices, including hard and floppy disk drives 912, CD-ROM drives 914, and other hardware capable of reading and/or storing information such as DVD, etc. In one embodiment, software for carrying out the above discussed steps may be stored and distributed on a CD-ROM 916, diskette 918 or other form of media capable of portably storing information. These storage media may be inserted into, and read by, devices such as the CD-ROM drive 914, the disk drive 912, etc. The server 901 may be coupled to a display 920, which may be any type of known display or presentation screen, such as LCD displays, plasma display, cathode ray tubes (CRT), printer, etc. A user input interface 922 is provided, including one or more user interface mechanisms such as a mouse, keyboard, microphone, touch pad, touch screen, voice-recognition system, etc.

The server 901 may be coupled to other computing devices, such as landline and/or wireless terminals via a network. The server may be part of a larger network configuration as in a global area network (GAN) such as the Internet 928, which allows ultimate connection to the various landline and/or mobile client/watcher devices.

The disclosed exemplary embodiments provide a method, network and node for using an adaptive discovery system. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for adaptive service discovery in a Distributed Hash Table, DHT, based Peer-to-Peer, P2P, overlay network, the overlay network including plural peers and some of the plural peers providing various services, the method comprising:
   using the adaptive service discovery in the DHT P2P overlay network for finding a peer that provides a desired service;
   generating a tree structure for current peers that provide the desired service;
   assigning the current peers that provide the desired service to different levels of the tree structure;
   estimating, when a peer intends to register for the desired service with the adaptive service discovery, a number S of actual peers that provide the desired service; and
   calculating, based on the estimated number of actual peers providing the desired service, an optimal starting level for the peer to register for the desired service,
   wherein each level of the tree structure has a predetermined number of tree nodes.

2. The method of claim 1, wherein the adaptive service discovery is a modified Recursive Distributed Rendezvous, ReDiR, a standardized protocol.

3. The method of claim 1, further comprising:
   using the calculated optimal starting level when a peer uses the adaptive service discovery to discover a peer providing the desired service.

4. The method of claim 1, wherein the step of estimating comprises:
   performing one get operation for an identifier of the peer that intends to register and M−1 get operations for randomly selected identifiers of the peers that provide the desired service at a currently used starting level of the tree structure.

5. The method of claim 4, further comprising:
   calculating the number S of actual peers that provide the desired service by using the expression:

$$S = \frac{\sum_{i=0}^{M} R_i}{M} \times b^{SL_{current}},$$

where M is a natural number, $R_i$ is a number of records contained in a node i, b is a branching factor, and $SL_{current}$ is a current starting level,
wherein the branching factor b is given for a desired service and determines how many nodes are in each level of the tree structure.

6. The method of claim 5, further comprising:
   estimating the number S every time a peer that provides the desired service refreshes its record with the adaptive service discovery.

7. The method of claim 1, wherein the step of calculating further comprises:
   calculating a first probability $P_1$ that a successor of the peer performing the estimation of S is found at a current starting level of the tree structure;
   calculating a second probability $P_2$ that the peer performing the estimation of S has either the highest or lowest identifier in its interval at the current starting level of the tree structure;

determining the highest value of $P_1$ multiplied by $P_2$ for all possible starting levels; and
selecting the optimal starting level as that level that has the highest value of $P_1$ multiplied by $P_2$.

8. The method of claim 7, wherein $P_1$ is given by $$\min\left(\frac{S}{b^{SL_i}}, 1\right),$$

where b is a branching factor that determines how many nodes are at each level in the tree structure, and $SL_i$ is a starting level, and $P_2$ is given by $$\min\left(\frac{2}{\left(\frac{S}{b^{SL_i+1}}+1\right)}, 1\right),$$

and the quantity $P_1$ multiplied by $P_2$ is calculated for all values of i in the interval $0 \leq i \leq SL_{max}$, where $SL_{max}$ is a maximum starting level.

9. The method of claim 1, further comprising:
changing a current starting level to the optimal starting level when a difference between the current starting level and the optimal starting level is larger than a predetermined threshold value.

10. The method of claim 9, further comprising:
storing an additional record of a peer that determines the step of changing in the current starting level before changing to the optimal starting level.

11. The method of claim 1, further comprising:
adding a new field to each record of the adaptive service discovery to identify a current starting level.

12. The method of claim 1, further comprising:
selecting an optimal branching number b by calculating, using different branching numbers, probabilities associated with the overlay network for the different branching numbers and selecting the optimal branching number the one that produces the highest value, wherein the branching number b determines how many nodes are in each level of the tree structure.

13. The method of claim 1, further comprising:
generating a new tree structure for the desired service when a change is initiated from a current starting level to the optimal starting level.

14. A peer in a Distributed Hash Table, DHT, based Peer-to-Peer, P2P, overlay network, the overlay network including plural peers and some of the plural peers providing various services, the peer comprising:
an interface configured to communicate with the overlay network, and to use an adaptive service discovery in the DHT P2P overlay network for finding another peer that provides a desired service, wherein the adaptive service discovery includes a tree structure for current peers that provide the desired service; and
a processor configured to estimate, when the peer registers for the desired service with the adaptive service discovery, a number S of actual peers that provide the desired service, and also configured to calculate, based on the estimated number of actual peers providing the desired service, an optimal starting level for the peer to register for the desired service,
wherein each level of the tree structure has a predetermined number of tree nodes.

15. The peer of claim 14, wherein the adaptive service discovery is a modified Recursive Distributed Rendezvous, ReDiR, a standardized protocol.

16. The peer of claim 14, wherein the processor is further configured to:
use the calculated optimal starting level when using the adaptive service discovery to discover a peer providing the desired service.

17. The peer of claim 14, wherein the processor is further configured to:
perform one get operation for an identifier of the peer and M−1 get operations for randomly selected identifiers of the peers that provide the desired service at a currently used starting level of the tree structure.

18. The peer of claim 17, wherein the processor is further configured to:
calculate the number S of actual peers that provide the desired service by using the expression:

$$S = \frac{\sum_{i=0}^{M} R_i}{M} \times b^{SL_{current}},$$

where M is a natural number, $R_i$ is a number of records contained in a node i, b is a branching factor, and $SL_{current}$ is a current starting level,
wherein the branching factor b is given for a desired service and determines how many nodes are in each level of the tree structure.

19. The peer of claim 18, wherein the processor is further configured to:
estimate the number S every time the peer refreshes its record with the adaptive service discovery.

20. The peer of claim 14, wherein the processor is further configured to:
calculate a first probability $P_1$ that a successor of the peer performing the estimation of S is found at a current starting level of the tree structure;
calculate a second probability $P_2$ that the peer performing the estimation of S has either the highest or lowest identifier in its interval at the current starting level of the tree structure;
determine the highest value of $P_1$ multiplied by $P_2$ for all possible starting levels; and
select the optimal starting level as that level that has the highest value of $P_1$ multiplied by $P_2$.

21. The peer of claim 20, wherein $P_1$ is given by $$\min\left(\frac{S}{b^{SL_i}}, 1\right),$$

where b is a branching factor that determines how many nodes are at each level in the tree structure, and $SL_i$ is a starting level, and $P_2$ is given by $$\min\left(\frac{2}{\left(\frac{S}{b^{SL_i+1}}+1\right)}, 1\right),$$

and the quantity $P_1$ multiplied by $P_2$ is calculated for all values of i in the interval $0 \leq i \leq SL_{max}$, where $SL_{max}$ is a maximum starting level.

22. The peer of claim 14, wherein the processor is further configured to:

change a current starting level to the optimal starting level when a difference between the current starting level and the optimal starting level is larger than a predetermined threshold value.

23. The peer of claim 14, wherein the processor is further configured to:

select an optimal branching number b by calculating, using different branching numbers, probabilities associated with the overlay network for the different branching numbers and selecting the optimal branching number the one that produces the highest value, wherein the branching number b determines how many nodes are in each level of the tree structure.

24. A Distributed Hash Table, DHT, based Peer-to-Peer, P2P, overlay network, the overlay network including plural peers and some of the plural peers providing various services, the network comprising:

an adaptive service discovery protocol for finding a peer that provides a desired service, the adaptive service discovery protocol having a tree structure for current peers that provide the desired service;

a processor configured to estimate, when a peer intends to register for the desired service with the adaptive service discovery, a number S of actual peers that provide the desired service, and configured to calculate, based on the estimated number of actual peers providing the desired service, an optimal starting level for the peer to register for the desired service; and an interface connected to the processor and configured to communicate with the peer that intends to register and provide the optimal starting level.

* * * * *

UNITED STATES PATENT AND TRADEMARK OFFICE
CERTIFICATE OF CORRECTION

| | | |
|---|---|---|
| PATENT NO. | : 8,499,075 B2 | |
| APPLICATION NO. | : 13/022001 | |
| DATED | : July 30, 2013 | |
| INVENTOR(S) | : Mäenpää | |

It is certified that error appears in the above-identified patent and that said Letters Patent is hereby corrected as shown below:

On Title Page 2, item (56), under "OTHER PUBLICATIONS", in Column 1, Line 3, delete "Proceeedings" and insert -- Proceedings --, therefor.

In the Drawings:

In Fig. 3, Sheet 3 of 9, delete "Discorery delay (ms)" and insert -- Discovery delay (ms) --, therefor.

Signed and Sealed this
Third Day of December, 2013

Margaret A. Focarino
*Commissioner for Patents of the United States Patent and Trademark Office*